United States Patent [19]

Boutterin et al.

[11] Patent Number: 4,639,916
[45] Date of Patent: Jan. 27, 1987

[54] AUTOMATIC METHOD AND MACHINE FOR THE SIMULTANEOUS TESTING OF DATA PROCESSING SYSTEMS

[75] Inventors: Daniel Boutterin, Bretigny; Jean-Paul Bertaux, Kremlin Bicêtre; Alain Bader, Boulogne Billancourt, all of France

[73] Assignee: U.S. Philips Corporation, New York, N.Y.

[21] Appl. No.: 622,348

[22] Filed: Jun. 19, 1984

[30] Foreign Application Priority Data

Jun. 22, 1983 [FR] France ................ 83 10315

[51] Int. Cl.[4] ............................................. G06F 11/26
[52] U.S. Cl. ................................. 371/16; 364/200
[58] Field of Search ................. 371/15, 16, 18, 21, 371/20, 25; 364/200, 900, 131, 132, 141, 551, 167, 162, 186, 189, 146, 171

[56] References Cited

U.S. PATENT DOCUMENTS

| | | | |
|---|---|---|---|
| 4,057,847 | 11/1977 | Lowell | 364/200 |
| 4,231,087 | 10/1980 | Hunsberger | 371/16 |
| 4,281,379 | 7/1981 | Austin | 364/132 |
| 4,347,608 | 8/1982 | Appiano | 371/16 |
| 4,371,952 | 2/1983 | Schuck | 371/16 |
| 4,456,951 | 6/1984 | Honneberger | 364/131 |
| 4,471,348 | 9/1984 | London | 364/551 |
| 4,489,414 | 12/1984 | Titherley | 371/15 |
| 4,511,982 | 4/1985 | Kurakake | 364/131 |
| 4,514,842 | 4/1985 | Starr | 371/15 |
| 4,531,182 | 7/1985 | Hyatt | 364/131 |
| 4,535,456 | 8/1985 | Bauer | 364/141 |
| 4,542,452 | 9/1985 | Fukai | 364/141 |

Primary Examiner—Michael R. Fleming
Attorney, Agent, or Firm—Jack E. Haken; James J. Cannon, Jr.

[57] ABSTRACT

A method and machine for testing data processing systems wherein the test result is an acceptance or another condition for the central processing unit of the data processing system. For each data processing system having an intended configuration, the method embodies one or more test programs, each program requiring a predetermined configuration of peripheral devices, the execution of a specific test program being started only after the verification of the presence of the required peripheral. In the absence of an intended peripheral, the test machine has means for simulating the presence of said peripheral device. The determination of the peripherals in a configuration and the selection of a test program from a library of such programs may be automatic or may be chosen by operator input. Thus, the method and machine provides of the simultaneous testing of a number of central processing units before delivery to the customers and with a configuration specified by the customer by time multiplexing peripheral test devices which can be automatically connected to the system to be tested.

14 Claims, 2 Drawing Figures

AUTOMATIC METHOD AND MACHINE FOR THE SIMULTANEOUS TESTING OF DATA PROCESSING SYSTEMS

BACKGROUND OF THE INVENTION

The present invention relates to a method for testing a plurality of data processing systems each by means of at least one test program from a first set of test programs, each data processing system comprising a central processing unit, a main memory, a stabilized power supply unit, and at least one control means for an associated peripheral device, and loading means for loading a test program in its main memory for execution by its central processing unit, each data processing system having an individual identification.

The data processing system may be contained in a cabinet, wherein the respective subsystems are located on cards with printed wiring and accommodating integrated circuit devices. Each peripheral may have its own peripheral control card, but this is no restriction. The identification of a data processing system is usually located in a predetermined memory location or has been entered by preprogramming of jumpers or switches (socalled straps). The identification can always be read out. A single data processing system may have more than one central processing unit, or, in addition to the central processing unit, one or more further processing units.

Testing of data processing systems is widely used. Such tests may be effected both at the manufacturer's, and at the site of later installation. These tests on the one hand relate to the testing of parts and subsystems in isolation, which is outside the scope of the present invention. On the other hand the data processing system as a whole should meet the specifications, that is, with peripheral devices, attached. Well known peripheral devices are data input devices, such as keyboards, optical character recognition devices and speech recognition devices. Peripheral devices for outputting data may be visual display units and printers. Further peripheral devices function as background stores, such as magnetic tape or disk drives and devices for laser-effected optical recording and reading.

SUMMARY OF THE INVENTION

One problem occurs when the data processing has been defined according to a certain configuration of peripheral devices, but the actual delivery is done without these peripheral devices proper, because the customer has opted for compatible peripheral devices from another make, sometimes called "plug-compatible peripheral devices". In this case the testing of the complete system must be done by means of temporarily assigning the required number of peripheral devices to the data processing system for executing the test program(s). It is an object of the invention to provide an automated test method for such data processing system by means of a relatively small number of peripheral devices according to a test scheme which allows for flexibility in the definition of the applicable test programs and a high degree of interchangeability of the data processing systems which may be of several differential configurations.

The object is realized in that the method is characterized by the following steps:
(a) providing a test machine for interconnection to said plurality of data processing systems, said test machine including a control unit, a power supply interconnection, and furthermore a second set of tool peripherals for being controlled by an associated and selectable one of said control means, further more including memory means for storing said first set of test programs and also operator interface means;

(b) entering into said test machine the respective configuration data of each respective data processing system of said plurality as represented by the number and nature of the control means for peripheral devices thereof;

(c) automatic-selecting by said test machine of the specific test programs as a subset from said first set for execution in each respective data processing system as determined by said number and nature;

(d) executing said testing by recurrently executing the following substeps:

(d1) scanning the data processing systems interconnected to said test machine;

(d2) for a data processing system scanned, scanning the specific test programs selected therefore;

(d3) for a specific test program thus scanned, accessing any tool peripheral necessary for execution of the test program in question for determining the availability of said tool peripheral and in case of availability, allocating the tool peripheral in question to the data processing system in question;

(d4) in case of unavailability of any tool peripheral necessary, first, scanning any tool peripheral adapted as a substitute for the unavailable tool peripheral, second, in case of unavailability of any necessary substitute tool peripheral, disallocating any tool peripheral allocated to the data processing system in question and thereupon scanning any remaining test program of said specific test programs for the data processing system in question for detecting an executability condition thereof as based on an availability of all necessary tool peripherals then allocated thereto, third, in case of absence of any executability condition for the data processing system in question, disallocating any tool peripheral allocated to the data processing system in question and returning to the substep of scanning the data processing systems;

(d5) in case of detecting an executability condition, loading the test program in question into the main memory of the data processing system in question for subsequent execution thereby and returning to the substep of scanning the data processing systems;

(d6) in said data processing system executing said test program as isolated from any other scanning, availability detecting, executability detecting, or allocating substep, and after terminating said executing, signalling said terminating to said test machine;

(d7) in said test machine upon receiving a terminating signal from a data processing system, disallocating any tool peripheral then allocated to the data processing system in question and returning to the substep of scanning the data processing systems;

(e) upon reaching an outputting condition, outputting test results from each test program executed, as represented by an OK/$\overline{OK}$ condition, a test program identity, and an identification as to the tested data processing system.

The tool peripherals in effect may be provided only to realize the testing; in reality they may be the normal type of peripheral devices for the type of data processing system in question. On the basis of the test result a certain data processing system may pass the test or fail. Certain errors may be repaired, e.g. by inserting a new subsystem, such as another peripheral control card.

By using this method, several actual configurations can be simultaneously tested by successively utilizing the same tool peripherals.

Actually, after the initialization steps during which an operator controls and defines the choice of the test programs to be executed by each actual configuration to be tested, the actual execution of the programs thus selected is automatically performed.

It is to be noted that manual intervention by a technician is no longer necessary for starting the execution of a program at the end of the preceding program, so that a substantial saving in time is achieved.

Performing the method in accordance with the invention is advantageously done with a test machine which comprises at least one processor, tool peripherals, and means for communicating with an operator; such a machine notably comprises first means for storing the specific composition of each actual configuration to be tested and the proposed specific menu of each actual configuration, second means for simultaneous connection to each actual configuration to be tested, third means for controlling the automatic selection of a test program for each actual configuration and for connecting to said configuration the peripheral tool (tools) for the duration of the execution of the selected test program, fourth means for starting and controlling the execution of the selected test program, and fifth means for outputting, on a data output device and under the control of an operator, the test results of said executed test programs.

The test machine for performing the method in accordance with the invention comprises a control system which is specifically adapted for the control and management of the execution of the test programs, simultaneously with the connection of the peripheral tools.

The tests are thus automated which is the principal advantage of the present invention which also offers other advantages which will become apparent from the following description of an embodiment which is given merely as a non-limitative example.

BRIEF DESCRIPTION OF THE FIGURES

For easy understanding, the test machine will first be described, followed by a description of its mode of operation. In the disclosure, the following explanatory Figures are referred to.

DISCLOSURE OF A PREFERRED EMBODIMENT

Figure 1:
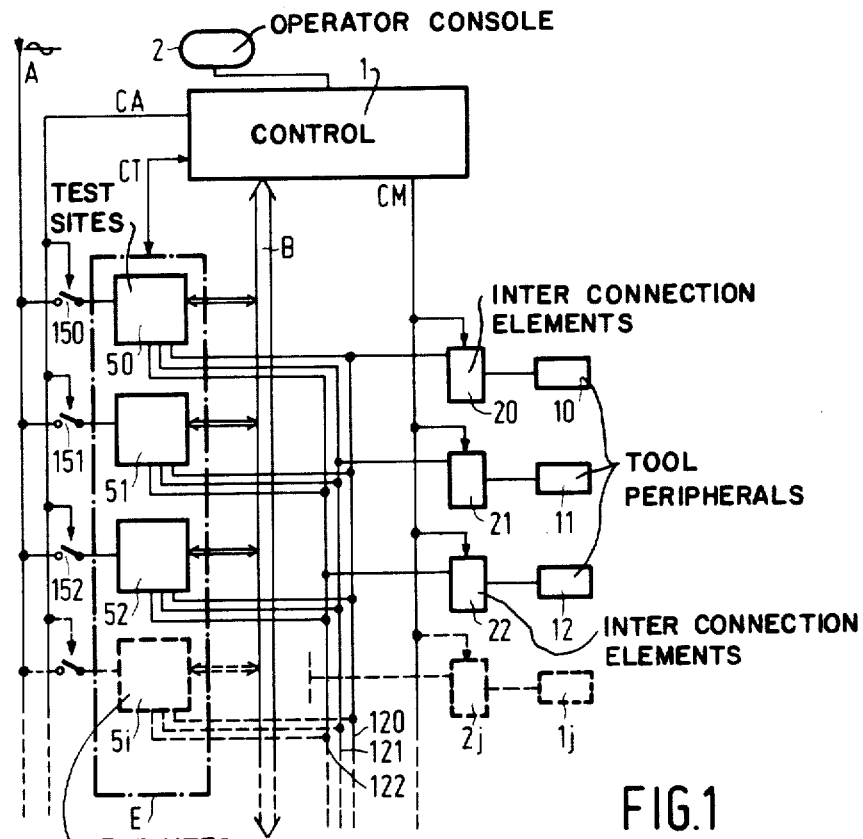
FIG. 1 shows the general lay-out of the test machine.

Referring to FIG. 1, the test machine comprises a control unit (1) and a number of tool peripherals (10, 11, 12, ... 1*j*). Each tool peripheral has an associated interconnection element (20, 21, ... 2*j*) which will be referred to as multiplexer. Furthermore, there are a number of test sites (50, 51, ... 5*i*) for the data processing systems or machine configurations to be tested, and an operator console (2) for bidirectional communication with a human operator. All the above elements are interconnected.

Each machine configuration to be tested, comprising one or more peripheral control cards (not shown) is installed in one of the test sites and is connected so that each associated peripheral control card may control an associated type of tool peripheral. If required, one or more of the data processing systems ay be installed without provision of any peripheral control card.

The multiplexers (20 ... 2*j*) are selectively controlled by the control unit 1 via interconnection CM, which may be single or multiple as required, The peripheral control cards in the respective data processing systems may be interconnected to the multiplexers by means of lines 120, 121, 122 which may be unidirectional or bidirectional as determined by the nature of the tool peripheral in question. Each multiplexer may have a separate connection to each of the test sites. In this case the selection for allocating the tool peripherals is effected by the associated multiplexers. Alternatively, the multiplexers may have fewer interconnections with the test sites. Then, for example, the selection for allocation may be done at the test sites. The latter selection may be done with a multiposition switch. Another solution, for example in the situation where a certain type of tool peripheral is provided only once, is that this tool peripheral has only a single interconnection to all test sites. All test sites are connected to the interconnection with an open collector buffer: all non-interacting tool peripherals are then at a high-impedance state with respect to the interconnection. It should be noted that the width of each interconnection's data/control path is prescribed by the normal requirements of the tool peripheral in question. For clarity, no further details have been shown.

Each test site (50, 51, ...) comprises a stabilized power supply fed by the public mains voltages (A) via an associated mains switch (150, 151, 152, ...) which is controlled selectively and independently by the control unit via the line CA. For clarity only a single line CA is shown.

The sites are situated in an enclosure or room (E) which includes temperature control means.

Adequate thermal isolation is present but not shown. In this way, the ambient temperature within room E may be raised or lowered according to the applicable test specifications. The temperature is controlled by control unit 1 via control connection CT. It is preferred to exact appreciable temperature changes when the operator is not present, for example during the night. It is well known that data processing systems may be more prone to operating errors when at high and/or low ambient temperatures; moreover, the introduction of temperature cycles would deliberately speed-up the aging of the data processing system tested and more readily bring out run-in faults.

The embodiment described comprises 16 test sites and 16 muliplexers with associated tool peripherals. The numbers i, j however need not necessarily be equal. The peripherals here are only used to effect the test programs and are therefore referred to as tool peripherals. However they may either be special types of peripherals having the required operating characteristics or be identical to the intended user peripherals.

The test machine also comprises transmission and control lines (B) for the transmission of data and instructions between the control unit and the machine configuration to be tested. In the preferred embodiment, all test sites are connected to the control unit in parallel, and the selection among the test sites is controlled at the control unit. However, other interconnection systems, such as a time-division organization or arbitrage on a common bus could also be realized.

During the test, the control unit functions as master, the respective data processing systems to be tested function as slave processors. The master controls the allocation of any tool peripheral to a slave processor during the time interval required for the execution of each test program, which exclusive allocation is performed by means of the multiplexers.

DESCRIPTION OF THE CONTROL UNIT

Figure 2:
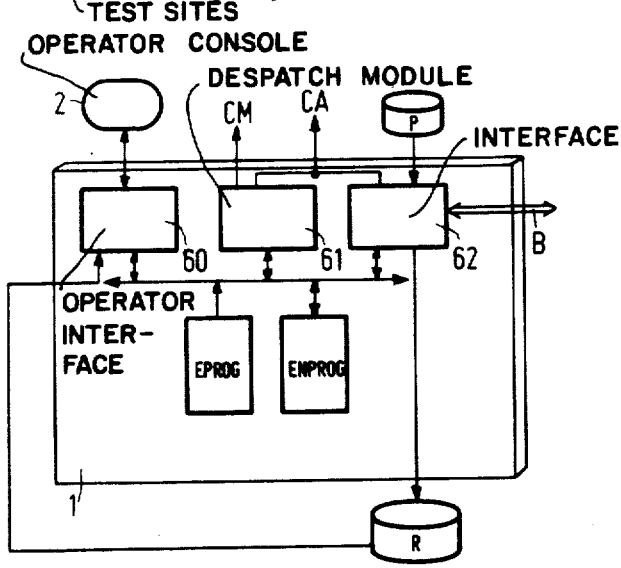
FIG. 2 shows the control unit of the test machine.

FIG. 2 shows the control unit (1) of the test machine which is formed by an automatic programmed unit. The subfunctions are realized by programmed modules which may, but need not be, separate hardware entities such as programmed logic arrays or PROM devices. The modules are an operator interface module 60 for interfacing to the operator console 2, a despatch module 61, and an interface module 62 for interfacing to line B connected to the respective test sites. Furthermore, the three modules also have in common a static test program table EPROG and a dynamic test program table ENPROG.

The static table EPROG comprises one item or line for each test program; each line comprises several fields which contain the characteristics of the test program;

PROG = name of the test program
TEMPS = maximum time permitted for the execution
NOCODE = code number of the test program
NOCARTE = type number of the control card(s) to be tested
COUPURE A = indicates that power interrupt is allowed before execution; this feature may be used to effect a reset
COUPURE P = power interrupt allowed during execution
NOPERIF = physical (type) number of the tool peripheral(s) required for the execution of the program.

In the preferred embodiment the table EPROG contains about fifty lines, which means that there are five test programs; several different programs may be applicable to the same type of peripheral control card.

The dynamic table ENPROG is formed by 16 subtables SENPROG, one for each associated test site.

Each subtable SENPROG contains dynamic test data, which data may be updated according to the result of an actual series of test programs; each subtable SENPROG (not separately shown) contains a separate line or item to store the results for each different test program. Each test program can be executed several times by the same machine configuration. Each subtable SENPROG comprises an indicator for the number of lines contained therein (NL), an indicator for the general status (IEG), and a counter for the number of power supply interruptions (NBCA) during execution of the test. Each line of each subtable contains the following data:

SPROG code number of the associated test program
COMPT number of executions already performed for the associated program
COMPTF number of executions performed with an error IEP indicator of the status of the program at a given instant.

For brevity, the code of the instructions between the control unit and the operator, and the code of the data in the respective tables are not elaborated.

DESCRIPTION OF THE OPERATION SEQUENCE:

For the execution of the operation sequence, first the module (60) is activated for determining the specific set of programs or menu of each actual machine configuration to be tested; to this end, the operator enters a first instruction to the control unit which comprises the physical number of the test site where the actual configuration to be tested is located. The operator interface module then resets the information of the associated subtable SENPROG to initial values which correspond to the number of the indicated site (for example: NBCA = "0", IEG = "to be tested", ...). Subsequently, the operator successively enters instructions indicating the types of each of the control cards constituting the actual configuration; the interface module then initializes for each card type a number of "n" (n = 1, 2, ...) lines in the subtable SENPROG, one for each test program (initial values: COMPT = COMPTF = 0; IEP = correct), during a sequential scan of the static and permanent data of the table ENPROG. This means that for each heading NOCARTE of a line of the table EPROG which equals the number of the control card indicated in the operator instruction a line of the table SENPROG is defined and filled with the heading NCODE (number of the code of the test program of the static table) and the heading SPROG of the dynamic table. Thus, a first selection is obtained for the assignment of one or more test programs to the data processing system or actual configuration. It is to be noted that the number "n" is not necessarily equal to the number of control cards of the configuration. On the one hand, the static table may contain several programs for one type of peripheral control card. Also, certain programs may test more than one peripheral control card, e.g. if two identical peripheral control cards are present in a single data processing system.

When the operator has completed the description of the configuration, he instructs the control unit to output the results of said first selection in order to check these results and, as the case may, in order to modify these results, if necessary; this selective check results in the final selection for the assignment of the "n" test programs which constitute the subset or "proposed specific menu" of the actual configuration which is connected to the site then indicated. If correct, control unit then stores the final value "n" under the heading NL of the subtable SENPROG. The described instruction sequence for initialization is effected in a specific user language.

This initialization advantageously combines the speed of the first, automatic assignment selection and the flexibility of the second, manual assignment selection.

The entire initialization operation may be successively executed once for each machine configuration connected to the test machine.

Thus, at the end of the initialization phase, all proposed menus which are specific of the actual machine configurations to be tested have been stored in the subtables SENPROG. The static data of the table ENPROG remain available and accessible because the headings SPROG and NOCODE are common to both tables. In the case where there are fewer actual machine configurations than there are test sites, any subtable SENPROG which is not used has initial values indicating this non-use (NL="0", IEG="not to be tested").

Next, the second module (61) is utilized for the sequencing of the programmed control unit.

This module serves to prepare the starting of the test programs so that optimum use is made of the capabilities of the test machine and also that all test programs of each proposed specific menu of each actual configuration may be started more than once. To this end, the module (61) recurrently executes the following substeps:

(1) searching an inactive configuration. The searching of an inactive actual configuration is performed notably by testing the value of the general status indicator (IEG) of each subtable SENPROG. The general status indicator may be multi-valued, with for example the following range: "to be tested", "needs tool peripheral", "running/busy". The value "to be tested" means that the associated machine configuration is a candidate for which a scanning of test programs may be made. During the recurrent executing and testing substeps the indicator IEG will usually assume other values.

(2) selection of one of the test programs of the proposed specific menu of the inactive machine configuration found. This selection is performed on the basis of the value of COMPT which represents the number of executions already performed for each program. The line of the subtable SENPROG whose values COMPT is lowest designates the program which is the candidate for execution. If two programs show the same number of executions the sequence number of tables SENPROG determines the next one to be executed. If a test program executed results in detection of a fault, the associated indicator COMPTF is incremented. If the value COMPTF reaches "3" the status indicator IEP thereof is set to the state "definitely wrong" and the program in question needs to be executed no more (until a reset thereof occurs). When a provisional selection of the program is effected, furthermore, the tool peripheral necessary for the execution is accessed for availability. To this effect the control unit accesses the information field NOPERIF of the corresponding line (SPROG=NOPROG) of the static table EPROG.

If the tool peripheral is available (free) the candidate program is definitely selected for execution. If a plurality of corresponding tool peripherals for the same program are present, they are scanned sequentially until either any necessary tool peripheral is found available or until all applicable tool peripherals have been scanned. In the latter case the program in question can not be executed. If any tool peripheral necessary is found available, it is allocated and no longer free for other programs. If a candidate program can not be executed because at least one necessary tool peripheral is unavailable, a further candidate program is scanned, until either one test program is found executable or none at all. In the latter case the system returns to the scanning of the data processing systems. If a certain test program has been executed correctly a predetermined number of times, no further execution is necesary. This may even be the case if the testing has been interrupted, for example, because a faulty peripheral exchange card had to be exchanged. Thus, the remaining part of the test is not prolonged unnecessarily.

(3) connection of the peripheral tool required for the execution of the selected program. This is effected by means of a command via the connection (CM) to the multiplexer (2 . . .) of the associated tool peripheral (1 . . .) for the machine configuration (5 . . .).

(4) setting the corresponding program indicator IEP to the value "ready for starting".

(5) setting the corresponding indicator IEG to the value "ready for starting".

The third module (62) is an interface with the machine configurations via the lines (B); this module serves on the one hand to start the execution of the programs that are "ready for starting". On the other hand the execution is supervised until completion.

To this end the module (62) recurrently executes the following substeps:

(1) searching for a configuration to be activated. This search is performed on the basis of a sequential scan of the indicator IEG of each subtable SENPROG. The value "ready for starting" set by the module (61) as described above is decisive and in that case the module (62) extracts from the table SENPROG the line of the test program whose indicator IEP also has the value "ready for starting". This line contains the code number of the test program SPROG which grants access to the corresponding line of the table EPROG via the information NOCODE. The module (62) then searches for the test program in a library of programs (P) which is stored, for example on a magnetic disc, in order to load this test program into the machine configuration via the lines (B). This may be done by the usual procedure "remote loading". After loading the test program is executed. At the start of the execution of the test program, module 62 controls the incrementing by "+1" of the associated value COMPT, sets indicators IEG and IEP to the value "being tested", and starts a time counter which automatically sets the indicator IEG to the value "time expired" when the time counter value exceeds the value "maximum time permitted for the execution" (TEMPS) contained in the table EPROG. To this end, the module (62) comprises a separate time counter or time counting register for each test site. During the execution of each test program, the test results are stored by the program with indication of the nature of any errors found. At the end of the execution, the test program despatches and "end of execution" signal to the module (62) via the lines (B).

(2) treatment of the ends of the programs. After having received a signal indicating the end of the execution of a test program, the module (62) performs the following operations: stopping and resetting the relevant time counter to zero, transferring the test results supplied by the executed program to the result file (R), for example a magnetic disc, and analyzing these results. If the results show an error, the quantity COMPTF is incremented; if any quantity COMPTF reaches a value "3", module (62) sets indicator IEP to the value "definitely wrong" which prevents further selection of the associated program for the data processing system in question. Subsequently, module 62 sets the indicator IEG of the data processing system in question to the state "inactive". At that instant the treatment of the end of the program is ready and module (62) resumes the scanning of the data processing systems in order to activate a next one. Both the states "inactive" and "to be tested" of indicator IEG signal indicate that the associated data processing system may be activated for testing.

(3) treatment of the expiration of the time. When a test program being executed does not stop itself before the corresponding time counter reaches the maximum authorized value (TEMPS), the module (62) detects the value "time expired38 of the indicator IEG. Then, module (62) controls the stopping of this incorrectly executed program and increments the associated counting value by "+1". Thereupon, module (62) resumes the normal treatment of the end of the program.

Next, the function "end of test" is described. According to the description hereabove modules 61 and 62 will continuously control the selecting and executing of the test programs, at least until all indicators IEP reach the state "definitely wrong". However, the function "end of test" may be initialized by the operator at an earlier time. This instruction is interpreted by the module (60). First of all it stops the test machine while allowing the current programs to be completed. Secondly it outputs the test results stored in the result file (R) on an output device, for example a printer and/or a display screen.

To this end, after having received the stop instructions from the operator, the module (60) sets all indicators NL to the value "0" so that the selection for the execution of one of the test programs on an inactive configuration will thereupon fail, because the module (61) for preparing the start does not explore the subtables SENPROG which contain zero lines. Thus, the selection for the execution is terminated, and all machine configurations are successively and definitively inactivated. The module (60), detecting that all indicators IEG are set either to the value "not to be tested" or to the value "inactive", then outputs the complete and final test results as described above. It also outputs the data contained in the subtables SENPROG.

The operator now has available data concerning the operation of each machine configuration to be tested, notably as regards the operation of each peripheral control card thereof.

The test machine may be used advantageously to connect the actual machine configurations in the sites (5 . . .) during the afternoon. Thereafter the initialization phase is performed so that the test machine operates automatically during the night, thus ensuring that each test program is excuted many times. The operator may stop the machine the next morning so that he can interpret the test results. The latter are reliable because, due to the automatic and recurrent nature of the tests, more and hence more complete test results are available.

It has been found that sometimes, for a minor technical reason, for example a connection error or the like, the test machine can not start the execution of any test program for one of the actual configurations. This problem is solved by executing a "test run" for each actual configuration before the start of the automatic test procedure. This test run is executed with a special program called the "reduced test" which tests a selection of basic functions, notably the central processing unit and the stabilized power supply unit. The reduced test program, is stored on the carrier (P) together with the other test programs and is systematically selected first when the selection module (61) detects that no program has yet been executed by any actual configuration. This detection takes place, for example by testing whether the indicator IEG has the initial value "to be tested" set by the module (60) at the end of the described initialization.

If the reduced test program is not correctly executed, the module (62) immediately issues a warning, for example, by means of an audio signal, so that the operator may intervene in order to repair, reconnect or replace the faulty configuration so that the automatic test can be performed.

The operator may intervene at any instant in order to stop the testing of any specific actual configuration. To this effect, the operator instructs the interface module (60) to set the indicator IEG of the actual configuration in question to the value "not to be tested", thus preventing selection by the module (61).

The operator may restart the testing of any single actual configuration again by instructing the interface module (60) to set the indicator IEG to the value "to be tested" or to the value "inactive".

A complementary extension enables the operator to request the output of the test results of a specific actual configuration from the result file (R) at any instant, regardless of the instantaneous value of the indicator IEG.

Actually the operator can stop the testing of any specific actual configuration at any instant without having to stop the testing of the other actual configurations, for example to replace any configuration whose testing has been terminated by another actual configuration. Thus, the test machine allows for the simultaneous and automatic testing of different types of actual configurations. In case a certain actual configuration after passing a certain number of tests shows a fault residing in a peripheral control card, the testing may be interrupted. Thereafter, the peripheral control card may be repaired or replaced and the testing resumed. In the later phases of the test, some test programs often do not need further execution because they were passed already. This obviously increases the throughput rate in the test machine.

A further extension of the test method selectively subjects the actual configurations to voltage interruptions, thus subjecting the stabilized power supplies to very severe strains.

Two types of power interruptions are generated by the test machine. On the one hand the module (61), after the selection of a test program explores the table EPROG and, when the indicator COUPURE-A is set, produces a current interruption of a few seconds' length for the relevant actual configuration. To this end, the power supply A (FIG. 1) of the test machine is connected to the test sites (5 . . .) by connections comprising switches (150, 151, 152, . . .) which are selectively remote-controlled via the line CA from the test machine. This current interruption must then control a reset operation in the actual configuration in question.

On the other hand, the module (62), after the remote loading of a test program explores the table EPROG and, if the indicator COUPURE-P is set, activates a delay member so as to produce, after a few seconds, i.e. the time necessary to ensure that the execution of the program has been started, a micro-interruption of the power supply during a few milliseconds. The same remote control (CA) of the same switches (150, . . .) is used. The latter current interruption may not cause a malfunction in the execution of the test program in question: it is necessary that the stabilized power supply should sustain sufficient power during such short power interruptions.

For each remote controlled interruption of the power supply, be it by the module (61) or by the module (62), the current interrupt counter NBCA of the corresponding subtable SENPROG is incremented by "+1". This information is output together with the other test results.

What is claimed is:

1. A method for testing a plurality of data processing systems, each by means of at least one test program from a first set of test programs, each data processing system comprising a central processing unit, a main memory, a stabilized power supply unit, and at least one control means for an associated peripheral device, and loading means for loading a test program in its main memory for execution by its central processing unit, each data processing system having an individual identification, said method being characterized by the following steps:
   (a) providing a test machine for interconnection to said plurality of data processing systems, said test machine including, a control unit, a power supply interconnection, a second set of tool peripherals controlled by an associated and selectable one of said control means, memory means for storing said first set of test programs and operator interface means;
   (b) entering into said test machine the configuration data of each data processing system of said plurality of data processing systems as represented by the number and nature of the control means for peripheral devices thereof;
   (c) automatic selecting by said test machine of specific test programs as a subset from said first set for execution in each data processing system as determined by said number and nature of said control means;
   (d) executing said testing by recurrently executing the following substeps;
      (d1) scanning the connection points of data processing systems interconnected to said test machine to determine the presence or absence of a system;
      (d2) for a data processing system present and connected, scanning the set of specific test programs which can be selected to test said system;
      (d3) for a specific test program selected, accessing any tool peripheral necessary for execution of the test program in question for determining the availability of said tool peripheral and in case of availability, allocating the tool peripheral in question to the data processing system in question;
      (d4) in case of unavailability of any tool peripheral necessary, first, searching for any tool peripheral adapted as a substitute for the unavailable tool peripheral, second, in case of unavailability of any necessary substitute tool peripheral, disallocating any tool peripheral allocated to the data processing system in question and thereupon scanning any remaining test program of said specific test programs for the data processing system in question for detecting an executability condition thereof as based on an availability of all necessary tool peripherals then allocated thereto, third, in case of absence of any executability condition for the data processing system in question, disallocating any tool peripheral allocated to the data processing system in question and returning to the substep of scanning the data processing system;
      (d5) in case of detecting an executability condition, loading the test program in question into the main memory of the data processing system in question for subsequent execution thereby and returning to the substep of scanning the data processing systems;
      (d6) in said data processing system executing said test program as isolated from any other scanning, availability detecting, executability detecting, or allocating substep, and after terminating said executing, signalling said terminating to said test machine;
      (d7) upon receiving a terminating signal from a data processing system, disallocating in said test machine any tool peripheral then allocated to the data processing system in question and returning to the substep of scanning the data processing system;
   (e) upon reaching an output condition, outputting test results from each test program executed, as represented by an OK/$\overline{OK}$ condition, a test identity, and an identification as to the tested data processing system.

2. A method as claimed in claim 1, wherein in an executing and testing step each data processing system is initially tested once by a reduced test program for testing elementary functions of the central processing unit thereof and the stabilized power supply thereof.

3. A method as claimed in claim 2, wherein an incorrect execution of a reduced test program is signalled at said operator interface means directly upon reception of the associated terminating signal.

4. A method as claimed in claim 1, 2 or 3, wherein during an recurrently executing and testing step the subset of test programs for a particular data processing system is modified from said automatically selected subset under operator control at an instant when no test program is being executed by the data processing system in question.

5. A method as claimed in claim 4, wherein starting and finishing said executing and testing step for a particular data processing system is effected unconditionally under operator control.

6. A method as claimed in any one of claims 1 through 3, further including the step of storing in memory the number of executions of a particular test program by a particular data processing system until after finishing the testing of the data processing system in question and wherein after interrupting said executing and testing step at the intended restart thereof leaving unselected the particular test program for the data processing system in question if the number stored in memory therefor lies above a predetermined minimum value.

7. A method as claimed in any one of the claims 1 through 3, wherein during said executing and testing step at least one cyclic variation is induced in the ambient temperature for at least one data processing system.

8. A method as claimed in any of claims 1 through 3, wherein during said executing and testing step at least one power supply interruption for the stabilized power supply unit of at least one data processing system is controlled with a duration in the millisecond range to test for uninterrupted processing of the test program then being executed in the data processing system in question.

9. A method as claimed in any one of the claims 1 through 3, wherein before the execution of a test program at least one power supply interruption for the stabilized power supply unit of at least one data processing system is controlled with a longer duration than the power-sustaining-time of the power supply unit in question to test for a correct restart operation by the data processing system in question.

10. A method as claimed in any one of the claims 1 through 3, wherein under operator control during said executing and testing step outputting a test result is outputted on a data output device.

11. A test machine for testing a plurality of data processing systems, each by means of at least one test program from a first set of test programs, each data processing system comprising a central processing unit, a main memory, a stabilized power supply unit, and at least one control means for an associated peripheral device, and loading means for loading a test program in its main memory for execution by its central processing unit, each data processing system having an individual identification, said machine comprising at least one control unit interconnected to a plurality of tool peripherals, and operator interface means, characterized in that there are provided a plurality of test sites for installing data processing systems to be tested by interconnection to said control unit, in that said test machine further comprises storing means for storing the configuration data of each data processing system inclusive of indication data for indicating the subset of test programs applicable to each data processing system, selection means for automatically selecting a data processing system and a test program to be executed thereby, allocating means for allocating to a data processing system selected any tool peripheral necessary for the execution of a test program selected therefore, until the end of the execution of the test program in question, and outputting means for under operator control outputting test results of a test program executed, on an output device.

12. A test machine as claimed in claim 11, characterized in that it comprises means for supplying an audible signal when a reduced test program is not correctly completed.

13. A test machine as claimed in claim 11 or 12, characterized in that it comprises means for controlling a temperature cycle of one or more rooms in which a data processing system to be tested is situated.

14. A test machine as claimed in claim 11 or 12, characterized in that it comprises means of selectively controlling power supply interruptions of variable duration, interruptions or microinterruptions, in the stabilized power supply units of a data processing system to be tested.

* * * * *